Aug. 27, 1957  J. A. STALLINGS  2,804,324
SEAL
Filed Sept. 11, 1953
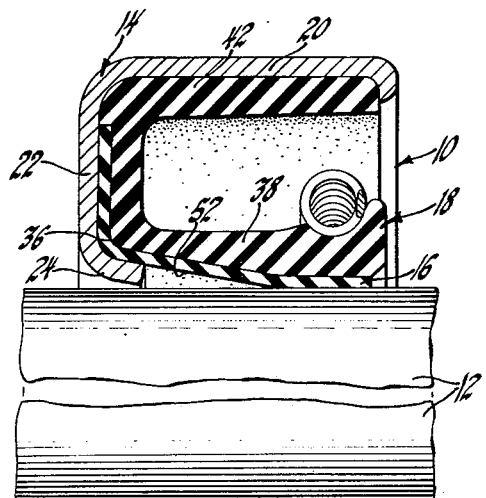
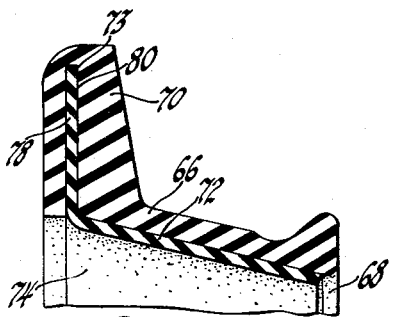
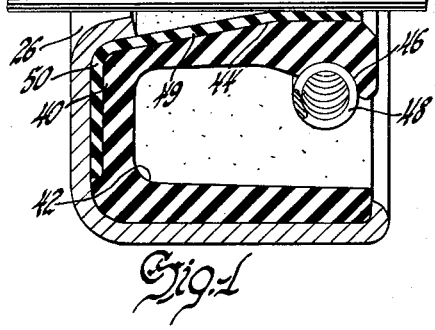
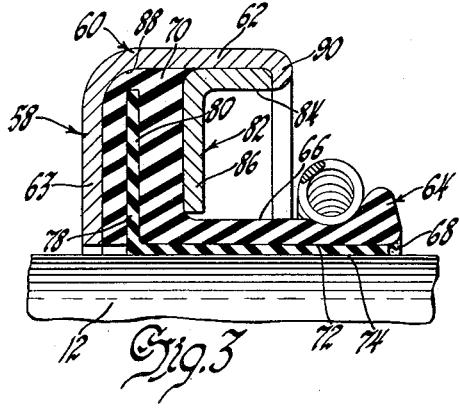
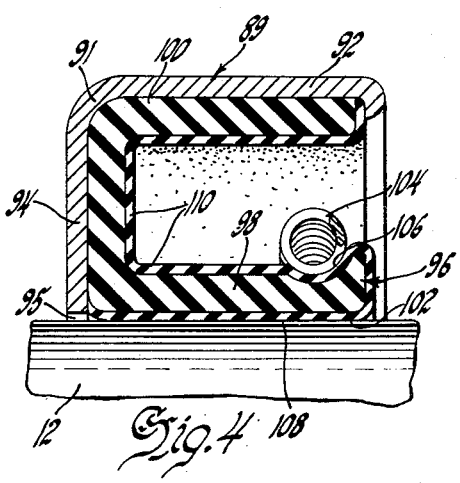
INVENTOR
John A. Stallings
BY
ATTORNEY

United States Patent Office 2,804,324
Patented Aug. 27, 1957

2,804,324

SEAL

John A. Stallings, Flint, Mich., assignor to General Motors Corporation, Detroit, Mich., a corporation of Delaware Application September 11, 1953, Serial No. 379,610

5 Claims. (Cl. 288—3)

The present invention relates to seals for journaling moving shafts and more particularly to seals for preventing the leakage of fluids along a rotating shaft.

When a moving shaft passes through a stationary member having a liquid on one side thereof, it is frequently necessary to prevent leakage of the liquids along the shaft. The seals best adapted for this service employ a resilient member having a tubular portion which is stretched over the shaft and held in wiping contact therewith. Since the effectiveness of such a seal is dependent upon the tubular portion being in tight wiping contact with the shaft, this portion is generally a resilient compound such as rubber. Although rubber performs satisfactory under normal operating conditions, in certain installations, it is necessary to employ extreme pressure oils which contain large amount of sulphur and other compounds that have a very harmful effect on rubber. As a result of the heat generated by the friction between the rubber tube and the rotating shaft, these substances rapidly age the rubber and cause premature failures of the seals.

It is proposed to provide a seal employing a sealing sleeve of one material and a resilient backing member of another material. This will eliminate the necessity for the sleeve to be made of a resilient material and therefore it may be fabricated from a pliable anti-friction material that is not subject to attack by the liquids to be confined. Also the backing member may be chosen from a material whose only characteristic is that it will provide the desired resilient action. Since the sleeve may comprise a material such as tetrafluoroethylene (commercially available under the trade name of "Teflon") that has a low co-efficient of friction, the heat generated in the seal will be greatly reduced and the useful life thereof will be greatly prolonged.

However, since materials such as tetrafluoroethylene which are suitable for the sealing sleeve do not have sufficient resilience to maintain the sleeve in proper contact with the shaft, it is necessary to employ a resilient backing member that engages the sleeve and maintains it in contact with the shaft at all times. By employing a separate sealing sleeve and a separate backing member, the effectiveness of the seal is not entirely dependent on the integrity of the backing member. Thus it is possible to employ a rubber backing member to insure the sealing sleeve engaging the shaft at all times. Furthermore, since the sleeve may be an anti-friction material, the temperatures will be reduced to a point where the action of the liquids on the rubber will be greatly diminished. Accordingly, it is possible for the backing member to be fabricated from a readily available and economical material.

In addition, since it is difficult to form or bond a sealing sleeve of tetrafluoroethylene to any other material, it is proposed to provide a seal employing novel means for securing the sleeve and backing member in position in the seal.

It is also proposed to provide a seal having a resilient backing member and a sealing sleeve in which the sealing sleeve protects the backing member from the liquids to be confined.

In the one sheet of drawings:

Fig. 1 is a cross-sectional view of a seal embodying the preferred form of the invention.

Fig. 2 is a cross-sectional view of a portion of the backing member and the sealing sleeve for a modified form of the invention.

Fig. 3 is a cross-sectional view of a portion of a seal embodying the structure of Fig. 2.

Fig. 4 is a cross-sectional view of a portion of a further modification of the present invention.

Referring to the drawings in more detail, the present invention may be embodied in a seal which moves with a shaft or it may remain stationary and engage a moving shaft. In the present instance, the seal 10 is adapted to be secured to a stationary structure so as to be in wiping contact with a rotating shaft 12 and to prevent the escape of fluids along the shaft 12. The seal 10 may be provided with a retaining member such as the rigid outer casing 14 of metal. The casing supports a sealing ring or sleeve 16 and a resilient backing member 18. The casing 14 has a substantially cylindrical portion 20 which is preferably adapted to be secured to a stationary supporting structure such as a transmission housing by any suitable liquid proof joint. One end of the cylindrical portion 20 may be provided with a radially inwardly projecting flange 22 which has the inner edge 24 thereof rolled axially inwardly. This will form an opening 26 through the center of the casing 14 which is adapted to receive the rotating shaft 12.

The resilient backing member 18 may have a radial end 40 with an inner tube 38 and an outer skirt 42 formed to project in spaced concentric relation from one side thereof. The skirt 42 and end portion 40 engage the inside of the cylindrical portion 20 and flange 22 and are preferably bonded thereto by means of a liquid tight seal such as vulcanizing. When the backing member 18 is secured in position on the casing 14, the tubular portion 38 forms a passage 44 that will register with the opening 26 in the center of the outer casing 14. The passage 44 is adapted to receive the shaft 12 and it is preferably of such size and shape that when the shaft 12 is disposed therein, the tubular portion 38 will be tightly stretched over the shaft 12 to place the inner surface in tight wiping contact with the shaft 12. Since the primary function of member 18 is not to act as a sealing member but merely to provide a resilient backing action, it may comprise a material which is very resilient and is easily bonded to the casing by vulcanizing or any other suitable liquid tight joint. Rubber has been found to be very good for this use. The exterior of the tubular portion 38 of the backing member 18 may be provided with a groove 46 that is adapted to receive an annular garter spring 48 that will tend to contract and bias the surface formed on the tubular portion 38 by the passage 44 against the shaft 12.

The sealing member 16 which is provided for wiping contact with the rotating shaft 12 may have a sleeve portion 49 with a radial lip 50 on one end. The lip 50 fits against the flange 22 and the rolled edge 24 and may be secured or bonded thereto by any suitable means such as heating. The sleeve portion may be disposed in passage 44 so as to be in intimate contact with the inner surface of the tubular portion 38. The inner surface of sleeve 16 may form a wear receiving surface 52 that is adapted to be in wiping contact with the shaft 12.

Since the backing member 18 will provide a resilient support that will maintain the surface 52 of the sleeve portion 49 against the shaft 12, the sleeve 16 does not necessarily have to be resilient. Therefore, it may be fabricated from a pliable material which has a low coefficient of friction and which is not subject to attack from the liquids that are to be confined. Tetrafluoroethylene which is commercially available under the trade name of "Teflon" has been found to be well adapted for this use as it has a very low co-efficient of friction and it is inert on oils such as are used in automatic transmissions. It is thus apparent that the reduced amount of friction will greatly decrease the amount of heat present in the seal 10. Since the presence of heat greatly accelerates the action of the oils on the rubber, the rubber will not age as rapidly as in the seals in which rubber engages the shaft. In addition, if the rubber should develop a rupture, the seal 10 will not necessarily fail as the sealing sleeve 16 will still remain imperforate and provide the necessary sealing action.

To assemble the seal 10, sealing sleeve 16 is placed against the inwardly rolled edge 24 and flange 22. Next the rubber backing member 18 is placed inside of casing 14 so as to fit against the interior of cylindrical portion 20 and flange 22 so as to force the lip 50 of the sealing sleeve 16 against the flange 22. The sleeve 16 and member 18 then be bonded in place by any suitable means such as the application of heat. Of course it should be understood the casing 14, the sealing sleeve 16, and the backing member 18 may be secured together by any suitable means either simultaneously in one operation or otherwise. It should be noted that if the bond between lip 50 and the flange 22 fails, the bond between the backing member and the casing will prevent the fluid escaping and it will also retain the member 16 in position. The garter spring 48 may be placed in groove 46 either before or after the seal 10 is installed in its operating position.

When fully assembled one side of the lip 50 on the sealing sleeve 16 will fit against the flange 22 and the rolled edge 24 while the other side thereof cooperates with the end portion 40 and tubular portion 38 of the backing member 18. Thus the contracting of the backing member 18 will cause the exterior of the sealing sleeve 16 to be in intimate contact with the surface of the tubular portion 38 formed by the passage 44. If the sleeve 16 is thin enough and comprises a pliable material, the contracting of the tubular portion 38 and the spring 48 will insure the sealing sleeve 16 being in wiping contact with the shaft 12 at all times.

In the modification shown in Figs. 2 and 3, the sealing sleeve is mechanically retained in position in the seal 58. The casing 60 may have a cylindrical portion 62 with a radial flange 63 on one end thereof similar to that in the preferred embodiment. However, in this modification, it is not necessary to have the inner edge of the flange rolled axially inwardly.

The backing member 64 which may be fabricated from the same material as in the preferred embodiment is provided with a tubular portion 66 having a passage 68 therethrough that is adapted to receive a rotating shaft 12. A radially outwardly projecting rim 70 is provided on one end of the tubular portion 66. The rim 70 is adapted to abut against the flange 63 on the end of the casing 60 so that the passage 68 will register with the opening formed by the flange 63 on the end of the casing 60. The rim 70 may be provided with an annular groove 73 that extends radially outwardly into the rim and has the open end thereof accessible from the passage 68.

The sealing sleeve 72 may be fabricated from tetrafluoroethylene or any other suitable anti-friction material. The sleeve 72 is adapted to be positioned in the tubular portion 66 so that the exterior of the sleeve 72 will be in intimate contact with the walls of the passage 68. The interior of the sealing sleeve 72 is similar to that of the preferred embodiment in that it is adapted to form a wear receiving surface 74 that is in wiping contact with the shaft 12. One end of the sleeve 72 may be provided with a lip 78 which is adapted to fit into the groove 80 in the rim 70.

A clamp 82 may be provided for retaining the backing member 64 and the sealing sleeve 72 in position. The clamp 82 has a drum portion 84 that is adapted to be a press fit into the cylindrical portion 62 of the casing 60. A flange 86 on one end of the drum portion 84 is disposed substantially parallel to the flange 63 on the casing 60 so as to form an annular space 88 therebetween which is adapted to receive the rim 70 on the backing member 64. Thus when the clamp 82 is forced into the casing 60, it will compress the rim 70 and the lip 78 on the sealing sleeve 72 against the flange 63 and thereby retain them in position. If rim 70 is tapered when the backing member 64 is stretched over the shaft 12, the rim 70 will be forced into the annular space 68. As the rim 70 is forced into this space, the taper will tend to wedge the rim 70 and lip 78 more solidly into the annular space. If it is thought advisable, the backing member 64 may be vulcanized onto either the casing and/or the clamp. In order to insure that the clamp remains in the casing, the edge 90 of the drum portion 62 may be rolled inwardly over the end of the clamp 82.

Fig. 4 discloses a further modification of the seal 89. The casing 91 is similar to the other embodiments in that it has a cylindrical portion 92 and a radially inwardly turned flange 94 on one end thereof. The flange 94 forms an opening 95 in the center of the seal 89 that is adapted to receive the rotating shaft 12.

A backing member 96 having a tubular portion 98 with a skirt 100 on one end thereof. The backing member 96 of this embodiment may be fabricated from a suitable resilient material such as a rubber similar to that in the other embodiments. The skirt 100 may be bonded or vulcanized onto the casing 91. The tubular portion 98 forms a substantially cylindrical passage 102 that is adapted to receive the shaft 12 and is positioned to register with the opening 95. The passage 102 is preferably of such size and shape that it is necessary for the tubular portion 98 to be stretched when the shaft 12 is disposed in the passage 102. This will tend to maintain the inner surface formed in the tubular portion 98 by the passage 102 in tight wiping contact with the shaft 12. A garter spring 104 may be disposed in an annular groove 106 in the back of the tubular portion 98 so as to bias the tubular portion 98 inwardly to further insure that the surface formed in the tubular portion 98 by the passage 102 will be in proper contact with the shaft at all times.

In this embodiment the wear receiving surface 108 is not formed by a separate member. Instead the entire exposed surface of the backing member including the inner surface of the passage 102 through the tubular portion 98 may be coated with an anti-friction material 110 which is impervious to the liquids that are to be confined. This inert material entirely encloses the backing material to form a protective coating that will prevent the liquids from coming into contact with the backing member. Polyacrylic rubber has been found to be particularly well adapted for this use. This material will not deteriorate as a result of contact with the liquids, it will prevent failure as a result of a chemical reaction with the liquids. The backing member may be a resilient substance which is subject to attack from the liquids. Therefore the coating of the material 110 may be extended completely over the entire surface of the backing member 96. This will make it extremely difficult, if not impossible, for the liquids to come into direct contact with the backing member 96. Therefore the life of the seal 89 should be extended considerably.

Although several embodiments have been illustrated and described herein, it will be apparent to those skilled in the art that the invention may be embodied in numerous other specific forms without departing from the true spirit thereof. It is therefore to be understood that it is

What is claimed is:

1. A seal adapted to receive a moving shaft and to prevent the flow of liquids therepast, said seal comprising a casing having a radially inwardly extending flange on one end thereof, a resilient backing member having a tubular portion with a passage extending therethrough, an outwardly tapering rim on one end of said tubular portion abutting said flange, said rim having an annular groove extending radially outwardly and being accessible from said passage, a tetrafluoroethylene sleeve disposed in said passage and being in intimate contact with the surface of the tubular portion defining said passage, a wear receiving surface formed on the interior of said sleeve adapted for wiping contact with said shaft, a lip on one end of said tetrafluoroethylene sleeve disposed in said groove, and a clamp secured to said casing and having a flange thereon spaced from said radial flange, said tapered rim and said lip being disposed between said flanges so as to be compressed therebetween.

2. A seal adapted to receive a moving shaft and to prevent the flow of liquids therepast, said seal comprising a casing having a radially inwardly extending flange on one end thereof, a resilient backing member having a tubular portion with a passage extending therethrough, an outwardly tapering rim on one end of said tubular portion abutting said flange, said rim having an annular groove extending radially outwardly and being accessible from said passage, a tetrafluoroethylene sleeve disposed in said passage and being in intimate contact with the surface of the tubular portion defining said passage, a wear receiving surface on the interior of said sleeve adapted for wiping contact with said shaft, a lip on one end of said tetrafluoroethylene sleeve disposed in said groove, a clamp secured to said casing and having a radial flange thereon spaced from said first radial flange, said tapered rim and said lip being disposed between said flanges and compressed therein, and a spring engaging said backing member and being adapted to resiliently urge said wear receiving surface into wiping contact with said shaft.

3. A seal comprising a rigid outer member having a substantially cylindrical portion and a radially inwardly extending end wall, a resilient backing member disposed inside of said rigid member and including a sleeve with a radially outwardly extending flange, said sleeve having a passage therethrough adapted to form a substantially cylindrical surface disposed in concentric spaced relation with said cylindrical portion and said radially outwardly extending flange being in juxtaposition to said inwardly extending end wall, said flange having an inwardly opening groove directly accessible from said passage, an impervious sealing member of a flexible material having a tubular portion and a radially outwardly extending flange, said tubular portion being disposed inside of said sleeve and adapted to be retained in intimate contact with said surface when in a sealing position, said last-mentioned outwardly extending flange being disposed inside of said groove, and a clamping member having a cylindrical portion secured to the interior of the cylindrical portion on said outer member and having a flange abutting said backing member and overlapping said groove and compressing said backing member against said end wall for compressing the flange on said sealing member in said groove.

4. A seal comprising a rigid outer member having a substantially cylindrical portion and a radially inwardly extending end wall, a resilient backing member disposed inside of said rigid member and having a sleeve and a flange, said sleeve being disposed inside of said cylindrical portion and having a passage therethrough adapted to form a substantially cylindrical surface, said flange extending outwardly along said end wall and being tapered in a radially outwardly direction, said flange having an inwardly opening groove accessible from said passage, an impervious sealing member having a tubular portion and a radially outwardly extending flange, said tubular portion being disposed inside of said sleeve in intimate contact with said surface, said last mentioned flange being disposed inside of said groove, and a clamping member having a cylindrical portion secured to the interior of the cylindrical portion on said outer member and having a flange parallel to said end wall extending radially to overlap both of said flanges and compress them against said end wall so as to clamp said sealing member within said groove.

5. The seal of claim 3 wherein said impervious sealing member consists of tetrafluoroethylene and annular spring means encompass said sleeve and said tubular portion for compressing them radially inwardly.

References Cited in the file of this patent

UNITED STATES PATENTS

| | | |
|---|---|---|
| 2,172,325 | Victor et al. | Sept. 5, 1939 |
| 2,227,771 | Victor et al. | Jan. 7, 1941 |
| 2,329,028 | Austin | Sept. 7, 1943 |
| 2,401,539 | Benson | June 4, 1946 |
| 2,597,976 | Cousins | May 27, 1952 |
| 2,599,149 | Allen | June 3, 1952 |

FOREIGN PATENTS

| | | |
|---|---|---|
| 976,666 | France | Nov. 1, 1950 |